Feb. 19, 1963 G. K. McAULIFFE 3,078,416

GENERATOR FOR PRODUCING A SIGNAL HAVING A SYMBOLIC WAVEFORM

Filed July 9, 1959

WITNESSES

John E. Heasley, Jr.

James F. Young

INVENTOR

Gerard K. McAuliffe

BY J. W. Cleary

ATTORNEY

United States Patent Office 3,078,416

Patented Feb. 19, 1963

3,078,416

GENERATOR FOR PRODUCING A SIGNAL HAVING A SYMBOLIC WAVEFORM

Gerard K. McAuliffe, Baltimore, Md., assignor to Westinghouse Electric Corporation, East Pittsburgh, Pa., a corporation of Pennsylvania Filed July 9, 1959, Ser. No. 826,033
3 Claims. (Cl. 328—27)

This invention relates to a waveform generator and more specifically but not exclusively to a generator for producing a symbolic bipolar signal that is particularly adapted to transmitting information within a minimum bandwidth.

In copending application Serial No. 833,450, filed August 13, 1959, by Richard F. J. Filipowsky, entitled "Signal Transmission System," now abandoned, there is disclosed a transmission system for transmitting information. This transmission system has a relatively low bandwidth-to-signalling rate ratio and can be comparable to the same ratio for the conventional binary transmission systems now being employed. However, in the transmission system disclosed in this copending application, four discrete bipolar signals having symbolic waveforms are employed to transmit the information, so that the information rate can be larger than that of the conventional binary system. Further, these four waveforms are D.C. free so that no restorer equipment is required at the receiving end. As illustrated in this copending application these symbolic bipolar signals have characteristics which adapt themselves to simple and accurate detection. The present invention embodies a waveform generator which will generate two of these bipolar signals described in detail in the above copending application.

Accordingly, an object of the invention is to provide a new and improved waveform generator for producing a bidirectional signal having a waveform of a predetermined shape.

Another object of the invention is the provision of a new and improved waveform generator for producing bidirectional signals having symbolic waveforms which can be employed in the transmission of binary information and have a minimum or optimum bandwidth.

A further object of the invention is to provide a waveform generator which has a minimum of components and which will satisfactorily produce a bidirectional symbolic signal which can be employed in the transmission of binary information.

In copending application Serial No. 845,518, filed October 9, 1959, by Erich H. Scherer, entitled "Waveform Generator" a generator is disclosed which produces waveforms similar to those produced by the generator disclosed in the present application. In the application Serial No. 845,518 the waveforms are generated by serially producing a plurality of conterminous rectangular pulses and then integrating these pulses twice to obtain the second integral of the conterminous pulses. In the generator of the present invention the symbolic waveforms are generated by serially producing first, second and third rectangular conterminous pulses having the same time width. "Conterminous" when describing these rectangular pulses is intended to mean that the trailing edge of a pulse is in time coincidence with the leading edge of the next succeeding pulse. The first and third pulses are of the same sense or polarity and equal in amplitude whereas the second pulse is of opposite sense or polarity and with an amplitude and area twice the amplitude of the first or third pulses. The three conterminous pulses are integrated to produce two triangularly shaped pulses of opposite polarity. These pulses are then passed through a limiter clipper and then a low pass filter to remove the high frequency components therefrom.

Other objects and advantages will become apparent after a study of the following specification, when read in connection with the accompanying drawings, in which.

In the above-mentioned copending application entitled "Signal Transmission System" by Richard F. J. Filipowsky, filed August 13, 1959, Serial No. 833,450, there is described four bipolar symbolic information signals which have particular utility in transmitting information. As set forth in this copending application, the waveforms of these signals are bidirectional, have gradually increasing and gradually decreasing leading and trailing edges, and are functionally continuous with a continuous first derivative. Due to these characteristics, the waveforms have a minimum bandwidth and have a relatively low bandwidth-to-signalling rate ratio. As stated above, however, since each signal carries information equivalent to two binary information signals, the information rate of this system can be greater than that of the conventional binary system. These signals have various other features, set forth in the above copending application, which makes possible accurate detection, a minimum of cross talk, etc. In the present invention, there is disclosed a waveform generator for producing the "A" and "B" signals disclosed in the above-mentioned copending application. The "B" type waveform is the "A" type waveform inverted.

In the present invention, the "A" and "B" type signals are generated to closely approach the set of equations and characteristics of the "A" and "B" signals, set forth in the above copending application.

In copending application Serial No. 845,518, filed October 9, 1959, there is disclosed a generator for producing all four of the above-mentioned waveforms. The present invention relates to a waveform generator for producing only the "A" and "B" type signals.

Figure 1:
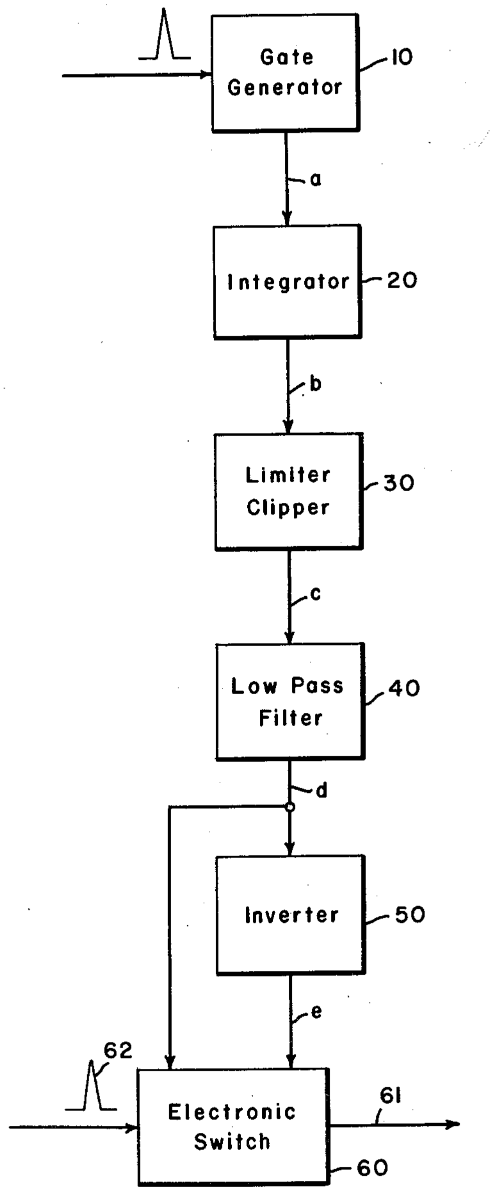
FIGURE 1 illustrates a schematic diagram in block form of one embodiment of the invention.
Figure 2:
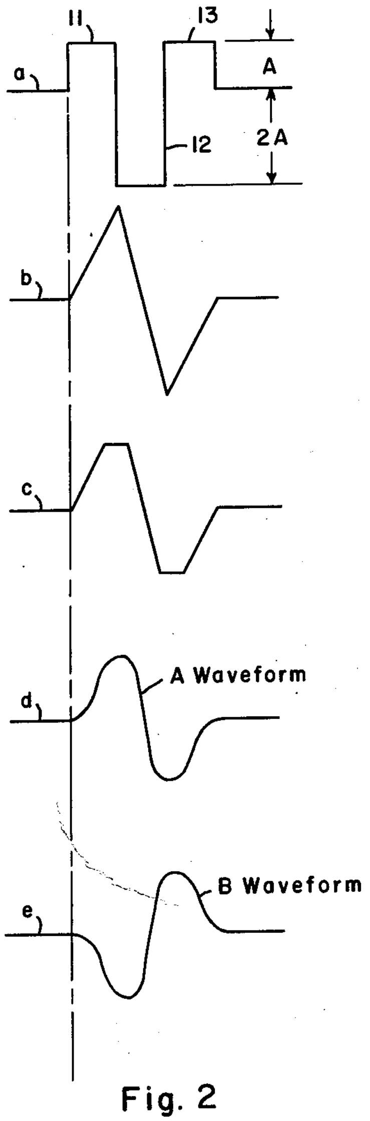
FIGURE 2 illustrates waveformsw hich occur at various points of the apparatus shown in FIG. 1.

More specifically, the embodiment of the invention shown in FIG. 1, includes a gate generator 10 to which an input pulse is supplied to thereby result in an "A" or "B" type signal at the output 61. Five points in the circuit shown in FIG. 1 are labeled "*a*," "*b*," "*c*," "*d*" and "*e*" and the corresponding waveform at these points of the circuit are shown in FIG. 2(*a*) through (*e*). As shown in FIGURE 2(*a*), when an input pulse is applied to the gate generator 10, the output is a continuous train of three rectangularly shaped pulses 11, 12 and 13. The second rectangular pulse 12 is opposite in polarity to the first and third pulses 11 and 13.

The waveform generator 10 can be a conventional type, to produce the three rectagnular pulses shown in FIG. 2(*a*). In constructing the embodiment shown in FIG. 1, three one-shot multivibrator circuits were used as the source of the rectangular pulses. The waveform shown in FIG. 2(*a*) illustrates the time length of the pulses 11, 12 and 13 as being equal. Additionally, the first pulse 11 and the third pulse 13 have equal amplitude and are of the same, polarity. The second rectangular pulse shown in FIGURE 2(*a*) is shown as having the same time length as the first and third pulses 11 and 13, but having an amplitude twice the amplitude of the first and third pulses 11 and 13. It has been found that the time length of the second pulse 12 should not be longer but could be somewhat shorter in the time length than the first and third pulses 11 and 13. If the second pulse 12 is made shorter than the first and third pulses 11 and 13, the amplitude of the second pulse 12 should then be made greater so that the total area of the pulse 12 is approximately twice the area of the first pulse 11 and twice the area of the third pulse 13.

The waveform illustrated by FIG. 2(*a*) is fed from the gate generator 10 to an integrator 20. The integrator 20 operates on the waveform shown in FIGURE 2(*a*) to produce the bidirectional skew type waveform shown in FIGURE 2(*b*). As can be seen from the waveform shown in FIGURE 2(*b*), the output of the integrator 20 has several sharp variations to produce high frequency components at the beginning and the end and at the upper and lower peaks. In the embodiment shown in FIGURE 1, high frequency components occurring at the upper and lower peaks of waveform "*b*" are substantially reduced by passing the waveform shown in FIGURE 2(*b*) through a limiter clipper 30 as to produce an output waveform "*c*" from the limiter clipper 30 as shown in FIGURE 2(*c*).

The output of the limiter clipper 30 shown in FIGURE 2(*c*), retains the relatively high frequency components at the beginning and the end of the waveform of the wave shown in FIGURE 2(*b*). However, the high frequency components at the peaks of this waveform have been substantially reduced by the limiter clipper. In order to further reduce the high frequency components at the peaks of the waveform shown in FIGURE 2(*c*), and also to remove the high frequency components from the beginning and the end of the waveform, the waveform "*c*" is then passed through a low pass filter 40. The low pass filter 40 is of the type having a good rejection to frequencies outside the required band so as to eliminate all high frequency components and limit the bandwidth of the waveform. The resulting output waveform "*d*" of the low pass filter 40 is shown in FIGURE 2(*d*), and identified as the A type waveform. It will be understood that the output of the integrator 20 could be fed directly to the low pass filter 40. However, for more accurate, efficient production of waveforms A and B it is passed through the limiter-clipper 30. Additionally, the clipper 30 eliminates the need of a large low pass filter.

Hence, as shown graphically in FIGURE 2, the "A" type waveform closely approximates the "A" type waveform illustrated in the above-mentioned copending application, entitled "Signal Transmission System," Serial No. 833,450. It will be understood that this waveform will therefore closely approximate the characteristics of the waveform desirable in the transmission system illustrated in the above copending application. As can be seen from FIGURE 2(*d*), the output waveform "*d*" from the low pass filter 40 is of a continuous function and, by approximating the exact waveform illustrated in the above-mentioned copending application. Hence it is seen that the disclosed generator will produce this waveform with a minimum of components and as has been discovered in tests with very good long term and short term stability.

The "B" type waveform illustrated in the copending application entitled "Signal Transmission System" is the "A" waveform inverted. Hence the output of the low pass filter 40, in the embodiment illustrated in FIGURE 1, is fed to inverter 50 to produce the "B" type waveform which is illustrated in FIGURE 2(*e*). The output of the inverter 50 is connected to an electronic switch 60. The low pass filter is also connected directly to the electronic switch 60 which will determine whether the output thereof is a signal having an "A" type or "B" type waveform. The electronic switch 60 can be employed to be responsive to an input pulse 62 to pass only the "A" signal with the "B" type waveform from the inverter 50 or a signal with the "A" type waveform emanating directly from the low pass filter 40. Hence an input pulse to the waveform generator 10 and a corresponding input pulse to the electronic switch 60 or no pulse to the electronic switch 60 will produce, depending upon the electronic switch employed, the desired output signal.

It is to be understood that certain alterations, modifications and substitutions can be made in this disclosure without departing from the spirit and scope of the invention.

I claim as my invention:

1. A generator for producing a signal having a bidirectional waveform comprising generator means for serially producing a first, second and third conterminous rectangularly shaped pulses, said first and said third pulses having equal areas and being opposite in polarity to said second rectangular pulse, the area of said second pulse being substantially greater than the area of said first or said third pulse, integrating means for integrating said waveform, and a low pass filter operatively connected to said integrating means for removing the high frequency components from the integrated waveform.

2. Apparatus for producing a signal having bidirectional waveform comprising generator means for sequentially producing a first, second and third conterminous rectangularly shaped pulses, said first and said third pulses being equal in area, said second pulse being opposite in polarity to said first and said third pulse and having an area equal to the area of said first and said third pulses, integrating means operatively connected to the output of said generator means, and filter means operatively connected to the output of said integrating means for removing high frequency components from the output thereof.

3. Apparatus for producing a signal having a bidirectional waveform comprising generator means for sequentially producing a first, second and third conterminous rectangularly shaped pulses having equal time lengths, said first and said third pulses being equal in amplitude, said second pulse being opposite in polarity to said first and said third pulses and having an amplitude twice the amplitude of said first and said third pulses, integrating means operatively connected to the output of said generator, a limiter clipper operatively connected to the output of said integrating means for removing high frequency components therefrom, and a low pass filter operatively connected to the output of said limiter clipper for further removing high frequency components from the output thereof.

References Cited in the file of this patent

UNITED STATES PATENTS

| | | |
|---|---|---|
| 2,456,026 | Shenk et al. | Dec. 14, 1948 |
| 2,498,659 | De Rosa | Feb. 28, 1950 |
| 2,566,836 | Grundmann | Sept. 4, 1951 |
| 2,583,484 | Guanella et al. | Jan. 22, 1952 |
| 2,700,696 | Barker | Jan. 25, 1955 |
| 2,784,256 | Cherry | Mar. 5, 1957 |
| 2,819,442 | Goodrich | Jan. 7, 1958 |

OTHER REFERENCES

"Waveforms," vol. 19, MIT Radiation Laboratory Series, 1949, page 22.